United States Patent [19]

Betencourt

[11] Patent Number: 4,730,845
[45] Date of Patent: Mar. 15, 1988

[54] ANCHORING DEVICE FOR A SLIDABLE UNIT, COMPRISING A TONGUE, IN PARTICULAR FOR A PASSIVE SAFETY BELT DEVICE

[75] Inventor: Joseph J. Betencourt, Pont-de-Roide, France

[73] Assignee: Aciers et Outillage Peugeot, Audincourt, France

[21] Appl. No.: 889,538

[22] Filed: Jul. 25, 1986

[30] Foreign Application Priority Data

Jul. 26, 1985 [FR] France .................. 85 11494

[51] Int. Cl.$^4$ .............................................. B60R 21/10
[52] U.S. Cl. .................................................. 280/804
[58] Field of Search ............................ 280/802, 804

[56] References Cited

U.S. PATENT DOCUMENTS

| 4,225,155 | 9/1980 | Seiffert et al. | 280/804 |
| 4,422,668 | 12/1983 | Thill et al. | 280/804 |
| 4,456,283 | 6/1984 | Forkel Michael et al. | 280/804 |
| 4,607,863 | 8/1986 | Yokote | 280/804 |

FOREIGN PATENT DOCUMENTS 2942207  4/1981  Fed. Rep. of Germany ...... 280/804

Primary Examiner—Ross Weaver
Attorney, Agent, or Firm—Sughrue, Mion, Zinn, Macpeak, and Seas

[57] ABSTRACT

This anchoring device, in which a maintaining member is disposed between a guiding rail (5) and a device for driving a slidable unit including a tongue, comprises a case (25) having a front side (26) in which is provided a slot (27) through which the tongue projects and of which the edges define two bearing surfaces adapted to cooperate with the tongue so as to withstand tensile forces exerted on the tongue. This device further comprises a device (32) for locking the slidable unit in an active position, adapted to prevent the displacement of the unit in a direction parallel to the guiding and retaining rail (5). This locking device comprises at least one locking element (33, 34) disposed in a cavity (35, 36) provided in the front side (36) of the case, the or each locking element being mounted to be movable between a retracted position, allowing the insertion or the withdrawal of the tongue from the active position, and a locking position in which the active parts of this locking element cooperate with complementary parts of the tongue and with the cavity for retaining the tongue in the active position.

12 Claims, 15 Drawing Figures

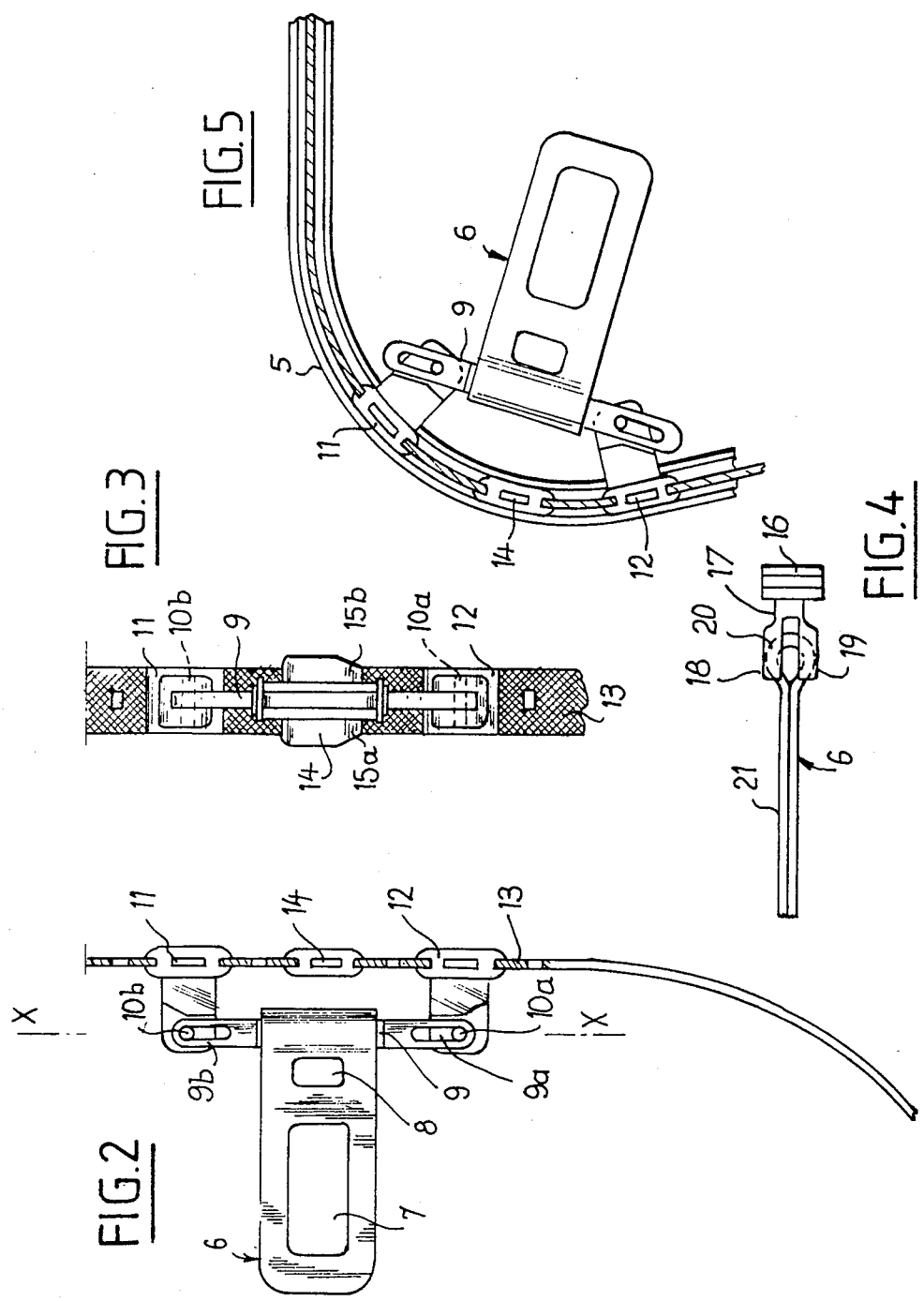

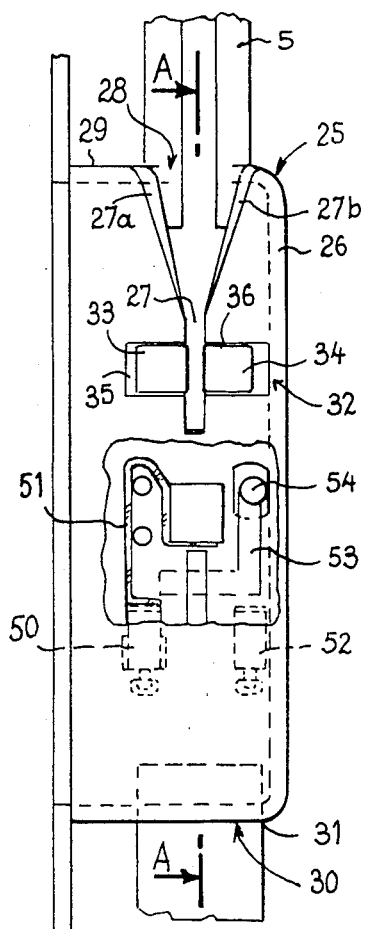
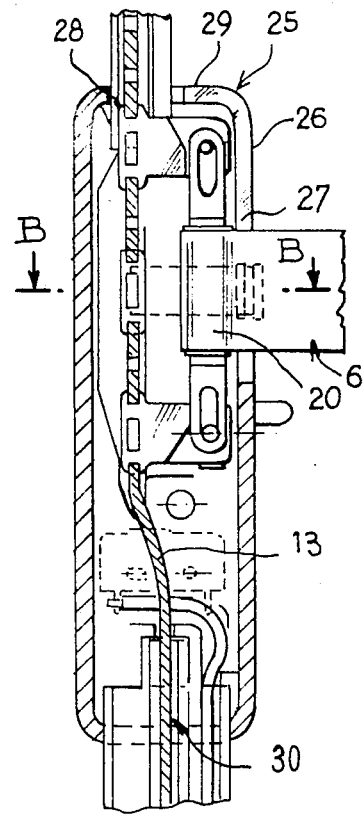
FIG.6  FIG.7
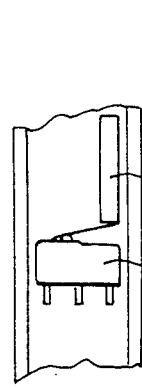
FIG.14
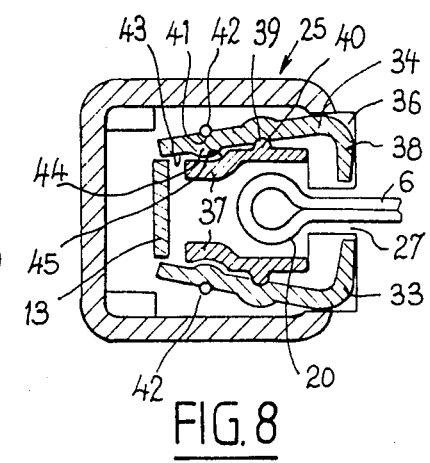
FIG.8
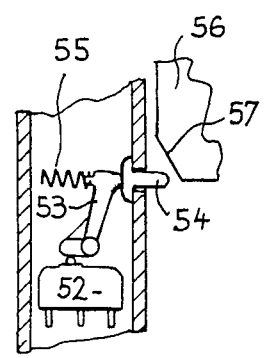
FIG.15

ANCHORING DEVICE FOR A SLIDABLE UNIT, COMPRISING A TONGUE, IN PARTICULAR FOR A PASSIVE SAFETY BELT DEVICE

The present invention relates to passive safety belt devices for a motor vehicle and more particularly to a device for anchoring a slidable unit which is part of the construction of such devices.

There is known in the art a device for anchoring a slidable unit comprising a bolt or tongue of use in particular in a passive safety belt device for a motor vehicle seat, of the type comprising a strap forming a shoulder strap wound at one end by a winder and carrying at its free end a buckle cooperative with the tongue, the slidable unit being mounted to move in a guiding and retaining rail connected to the body of the vehicle, between a standby position in which a user has access to his seat and an active position for retaining the user on his seat, under the effect of actuating means comprising a belt connecting the slidable unit to driving means, said device further comprising an element for maintaining the tongue, rigidly fixed to the frame of the vehicle and cooperating with the tongue, in the active position, so as to resist large tensile forces exerted on the tongue.

However, these devices have a certain number of drawbacks, in particular as concerns the safety of the passengers, for example in the event of an accident when the vehicle overturns, since the retention of the slidable unit in the active position is only ensured by the actuating means.

There are also known from the documents DE A 3105 480, DE A 3019 158, DE A 2942 207 and GB 2024 606, a number of devices for anchoring slidable units comprising means for locking these units in position, adapted to prevent the displacement thereof in a direction parallel to the guiding and retaining rail. However, the structure of these devices is such that they do not ensure in a perfectly reliable manner the locking of the slidable units in the active position.

An object of the invention is therefore to solve the problems mentioned hereinbefore.

For this purpose, the invention provides a device for anchoring a slidable unit comprising a tongue, of use in particular in a passive safety belt device for a motor vehicle seat, of the type comprising a strap forming a shoulder strap wound at one end by a winder and carrying at its free end a buckle cooperative with the tongue, the slidable unit being mounted to be movable in a guide and retaining rail connected to the body of the vehicle, between a standby position in which the user has access to his seat, and an active position for retaining the user on his seat, under the effect of actuating means comprising a belt connecting the slidable unit to driving means, an element for maintaining the tongue, rigidly fixed to the frame of the vehicle and cooperating with the tongue in the active position so as to resist tensile forces exerted on the tongue, said device comprising means for locking the slidable unit in the active position, adapted to prevent the displacement of the unit in a direction parallel to the guide and retaining rail and the maintaining element being disposed between the guide rail and the means for driving the slidable unit, wherein the maintaining element comprises a case including a front side in which is formed a slot through which the tongue projects and of which the edges define two bearing surfaces adapted to cooperate with the tongue for withstanding the tensile forces exerted thereon, said slot communicating with a first opening provided in a first lateral side of the case and in alignment with the guide and retaining rail so as to permit the passage of the slidable unit, the case comprising a second opening provided in a second lateral side of the case adapted to permit the passage of a part of the belt and the locking means are constituted by at least one locking element disposed in a cavity provided in the front side of the case, the or each locking element being mounted to be movable between a retracted position allowing the insertion or the withdrawal of the tongue from the active position, and a locking position in which the active portions of the or each locking element cooperate with complementary portions of the tongue and with the corresponding cavity for retaining the tongue in the active position.

A better understanding of the invention will be had from the following description which is given merely by way of example and with reference to the accompanying drawings, in which:

FIG. 2 is a side elevational view of a slidable unit which may be used with an anchoring device according to the invention;

FIG. 3 is a front elevational view of the slidable unit shown in FIG. 2;

FIG. 4 is a plan view of a slide and a tongue which is part of the construction of the slidable unit shown in FIGS. 2 and 3;

FIG. 5 shows a slidable unit in a certain position on a guide and retaining rail;

FIG. 6 is a front elevational view of an anchoring device according to the invention;

FIG. 7 is a sectional view taken on line A—A of FIG. 6 in which the slidable unit is shown in the active position;

FIGS. 8 to 13 are sectional views taken on line B—B of FIG. 7 illustrating the operation of the locking means which are part of the construction of an anchoring device according to the invention;

FIG. 14 shows means for detecting the presence of the slidable unit in the active position, and FIG. 15 shows means for detecting the presence of the buckle in the active position.

FIG. 1 shows diagrammatically a vehicle V whose driver's seat S is provided with a passive safety belt device.

Figure 1:
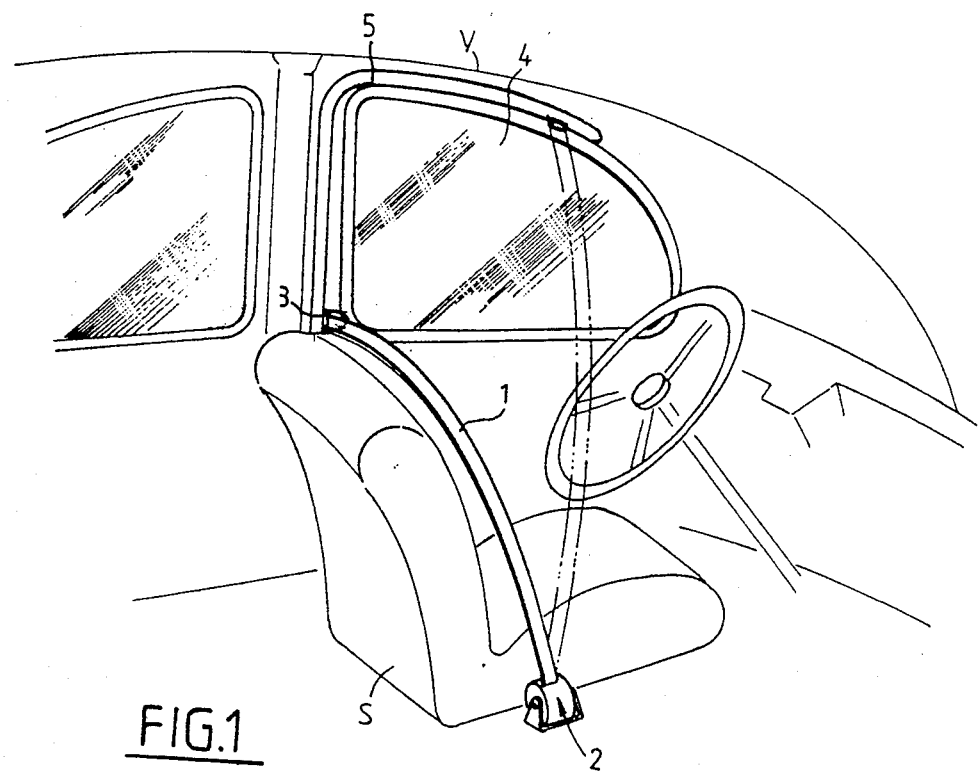
FIG. 1 is a diagrammatic perspective view of the compartment of a motor vehicle provided with a passive safety belt device.

The passive safety belt comprises a strap 1 constituting a shoulder strap having one end wound on a winder 2 disposed on the inboard side of the seat S. At its free end, opposed to the winder 2, the strap 1 carries a buckle 3 which cooperates with a bolt or tongue connected to a slidable unit (not shown) which moves around a door 4 in a hollow guide and retaining rail 5, a part of which is disposed against the vertical post of the body of the vehicle V, whereas another part bears against the outer edge of the roof above the opening for the door.

This slidable unit is mounted to be movable in the guide and retaining rail between a standby position shown in dot-dash lines in FIG. 1, in which a user has access to his seat, and an active position, shown in full lines, for retaining the user on his seat, under the effect of actuating means (not shown) comprising a belt connecting the slidable unit to driving means. An element for maintaining the tongue firmly fixed to the frame of the vehicle, is provided in the active retaining position so as to cooperate with the tongue and resist great tensile forces exerted on the latter.

As can be seen in FIG. 2, the slidable unit comprises a bolt or tongue 6 having a first opening 7 adapted to cooperate with the buckle connected to the safety belt strap and a second opening 8 whose function will be explained hereinafter. This tongue 6 is pivotally mounted on a rod 9 each end of which includes a flat portion provided with an opening 9a, 9b. Pivot pins 10a and 10b are respectively movable in the openings 9a and 9b of the rods 9, these pins being connected to slides 11 and 12 moulded onto a belt 13 which is part of the actuating means of the slidable unit. These slides 11 and 12 therefore cooperate with the guide and retaining rail and with the actuating means for displacing the slidable unit along the rail.

As can be seen more particularly in FIG. 3, the pivot pins 10a and 10b extend substantially in a direction perpendicular to the rod 9.

An actuating element 14 is also moulded onto the belt 13 and has inclined surfaces 15a and 15b whose function will be explained hereinafter.

Each slide (FIG. 4) comprises a base 16 engaged in the guide rail, a hooking arm 17 extending from this base and projecting out of the guide rail. Formed at the end of the arm 17 are two branches 18 and 19 between which the flat portion of the corresponding end of the rod is engaged and between which the corresponding pivot pin extends.

The tongue 6 is formed by a metal strip bent at 180° and including in the region of the bend an enlargement 20 defining a roughly cylindrical passage for the rod 9 and from which extends a planar portion 21 cooperative with the buckle. Note that the tongue 6 is longitudinally retained on the rod 9 by known devices (not shown). The tongue 6 is therefore mounted to pivot about an axis X—X (FIG. 2) which is substantially parallel to the guide rail.

As can be seen in FIG. 5, this structure of the slidable unit enables it to pass through rounded corners connecting the part of the guide rail disposed against the vertical post of the body of the vehicle and the part of the rail bearing against the upper edge of the roof above the opening for the door, whose curvature is relatively large. Indeed, this structure of the slidable unit enables it to pass through rounded corners whose radius of curvature is on the order of 40 mm.

Although in the presently-described embodiment the tongue is pivotally mounted on a rod which is pivotally mounted on two slides, it may also be pivotally mounted on a rod connected to a single slide slidable in the guide rail.

Shown in FIG. 6 is a device for anchoring this slidable unit and comprising a means for maintaining the tongue firmly fixed to the frame of the vehicle in the active position for retaining the user on his seat, so as to resist the considerable forces exerted on the tongue. This maintaining means comprises a case 25 having a front side 26 in which there is provided a slot 27 through which the tongue projects, this slot having edges defining two bearing surfaces adapted to cooperate with the tongue, and more particularly with the enlargement 20 of the latter, so as to withstand the tensile forces exerted on this tongue. This slot communicates with a first opening 28 provided in a first lateral side 29 of the case and in alignment with the guide and retaining rail 5 so as to permit the passage of the slidable unit.

The case 25 further comprises a second opening 30 provided in a second lateral side 31 of the case adapted to permit the passage of a part of the belt extending between the slidable unit and the driving means.

This anchoring device further comprises locking means 32 for locking the slidable unit in the active position and adapted to prevent the displacement of the unit in a direction parallel to the guide and retaining rail.

These locking means comprise at least one locking element and, in the illustrated embodiment, two locking elements 33 and 34 disposed in cavities 35 and 36 provided in the front side 26 of the case. These locking elements are mounted to be movable between a retracted position, allowing the insertion or the withdrawal of the tongue from the active position, and a locking position in which the active portions of these elements cooperate with complementary portions of the tongue and with the cavities for retaining the tongue in its active position.

As shown in FIG. 6, the locking elements 33 and 34 are disposed on each side of the slot 27 in the cavities 35 and 36 provided in the edges of the slot.

FIG. 7 is a sectional view, taken on line A—A of FIG. 6, in which the slidable unit is shown in its active position, i.e. engaged in the case 25. The tongue 6 then projects out of the case 25 through the slot 27 and its enlargement 20 can come to bear against the edges of the slot 27 defining the two bearing surfaces of the case.

As can be seen in FIG. 7, the first opening 28 and the second opening 30 of the case are provided at different distances from the front side 26 of the latter, so that the portion of the belt 13 extending between the slidable unit and the second opening is bent and extends obliquely relative to the front side of the case so that, when a thrust is exerted on this belt for disengaging the slidable unit from its active position, the unit is urged toward the inner wall of the case 25.

A more detailed description of the operation of this anchoring device will now be given with reference to FIGS. 8 to 13.

As can be seen in FIG. 8, which represents the locking means in the retracted position, the tongue or bolt 6 projects out of the case 25 through the slot 27. The enlargement 20 of the tongue comes to bear against the edges of the slot 27 when a pull is exerted on the tongue tending to cause it to leave the case 25. This case 25 includes an inner structure comprising two members 37 connected to the case and between which the enlargement 20 of the tongue is disposed.

The locking elements 33 and 34 are disposed between the members 37 of the inner structure and the case 25.

Each locking element is formed by a metal strip which has, adjacent one of its ends, a portion bent at 90° and forming a hook constituting the active portion of the locking element and adapted to engage in the opening 8 of the tongue, in the locking position. The locking elements 33 and 34 are identical and only the locking element 34 will now be described in detail.

This locking element 34 comprises a portion 38 bent at 90° and projecting out of the case 25 through the cavity 36 provided for this purpose in the front side of the case. In its central portion, the locking element has an articulation surface constituted by a first recess 39 bearing against a corresponding surface constituted by a first boss 40 on the corresponding member 37 of the inner structure. The locking element 34 has adjacent its other end a first bearing surface, constituted by a second recess 41 which cooperates with elastically yieldable means 42 which bias the locking element toward its retracted position, and a second bearing surface, constituted by a planar portion 43 of the locking element and adapted to cooperate with the actuating element 14 described with reference to FIGS. 2 and 3 and mounted on the slidable unit for the purpose of shifting and maintaining the locking element in its locking position.

Note that the first and second bearing surfaces of each locking element are formed on opposite sides of the metal strip and the elastically yieldable means are advantageously formed by a U-shaped spring 42 whose branches bear against the first bearing surfaces of the two locking elements so as to exert on the latter a force toward the interior of the case and bring each locking element to its retracted position.

The articulation surface and the second bearing surface of each locking element are formed on the side of the latter facing the interior of the case, Each locking element further comprises, between its articulation surface and its second bearing surface, a second boss 44 adapted to come to bear against a cavity 45 provided in the corresponding member of the inner structure, in the retracted position of the locking element, this second boss being provided in the locking element in alignment with the second recess 41 constituting the first bearing surface of the locking element.

As can be seen in FIG. 8, the belt 13 connecting the slidable unit to the actuating means is disposed between the second bearing surfaces of the two locking elements.

Figure 9:
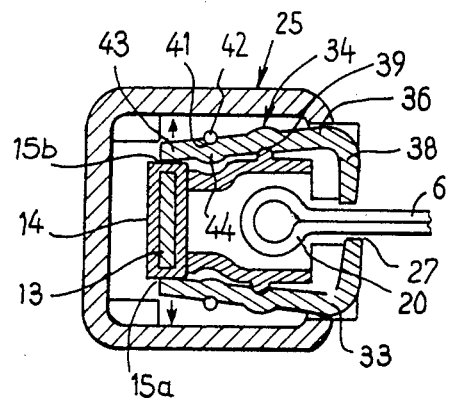

If reference is now made to FIG. 9, it can be seen that, when the slidable unit is more deeply engaged in the case, the actuating element 14, and more particularly the inclined surfaces 15a and 15b of the latter, spread apart the second bearing surfaces 43 of the locking elements 33 and 34, which, under the action of the spring 42, have a tendency to pivot about their corresponding articulation surface so that the portion bent at 90° and forming a hook moves toward the tongue 6.

The engagement of the slidable unit in the case being pursued (FIG. 10), the actuating element 14 progressively moves the second bearing surfaces of the locking elements 33 and 34 apart, so that the portions bent at 90° 38, come to bear against the solid portion of the tongue 6. In this position, the recess 39 of the locking element no longer bears against the boss 40 of the inner structure, but the spring 42 exerts a force which tends to maintain the locking elements 33 and 34 in this position.

When the opening 8 of the tongue (FIGS. 11 and 12) arrives in a position in alignment with the bent portions 38 constituting a hook of the locking elements 33 and 34, the actuating element 14 maintaining the relative position of the second bearing surfaces of the elements, the spring 42 exerts an action which causes these portions bent at 90° to enter this opening 8. When this displacement has terminated (FIG. 12), each locking element 33 and 34 is therefore bearing by its articulation surface 39 against the corresponding boss 40 of the inner structure, its second bearing surface 43 is maintained in a position relative to the corresponding surface of the other element through the actuating element 14, and its first bearing surface 41 is subjected to the action of the spring 42 which tends to urge the locking elements toward each other and therefore to maintain the portion 38 in the opening 8 of the tongue.

Note that the locking elements 33 and 34 perform no tongue-retaining function when a force F (FIG. 12) is exerted on the tongue which tends to cause it to leave the case 25. In this case, the enlargement 20 of the tongue comes to bear against the two bearing surfaces of the case which withstand the forces exerted on this tongue.

The locking elements 33 and 34 ensure the retention and the locking of the tongue in the active position and prevent the latter from moving in a direction parallel to the guide and retaining rail by cooperating with the edges of the opening 8 of the tongue and with the cavities 35 and 36 so as to maintain it in its active position.

The tongue is unlocked in the following manner:

Owing to the fact that the part of the belt 13 extending between the slidable unit and the second opening of the case is bent and extends in an oblique direction relative to the front side of the case, a thrust exerted on this part of the belt by the driving means for disengaging the slidable unit from its active position, urges this unit toward the inner end of the case. The actuating element 14 (FIG. 13) for actuating the locking elements 33 and 34 mounted on this slidable unit is then also urged toward the inner wall of the case so that it releases the second bearing surfaces 43 of the locking elements 33 and 34 which are then returned to their retracted position under the effect of the U-shaped spring 42. The locking elements 33 and 34 then pivot about the members of the inner structure so that the second boss 44 of the locking elements bears against the cavity 45, provided for this purpose in the members of the inner structure, in the retracted position. The portions 38 bent at 90° are then disengaged from the opening 8 of the tongue 6 so as to release the latter and the slidable unit can move in the case toward the guide and retaining rail 5.

Note that the slot 27 (FIG. 6) can advantageously be provided with inclined edges 27a and 27b in the region of its junction with the first opening 28 of the case, these edges being adapted to guide the tongue 6 when it is inserted in the case.

Means for detecting the presence of the slidable unit in the active position may also be provided in the case. These means (FIGS. 10 and 14) may be constituted by a switch 50 disposed within the case and actuated by the slidable unit through a spring strip 51 on which comes to bear, for example, the slide 12 of the slidable unit in the active position of the latter. This switch 50 may be for example adapted to cut off the supply of power to the driving means for driving the belt when the slidable unit is in its active position.

Figure 10:
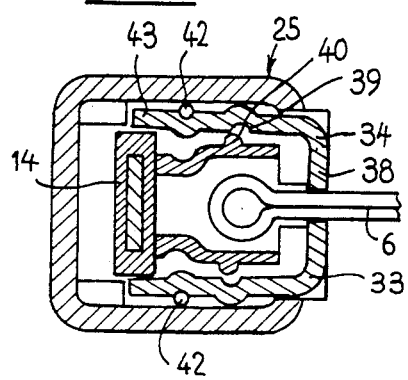
Figure 11:
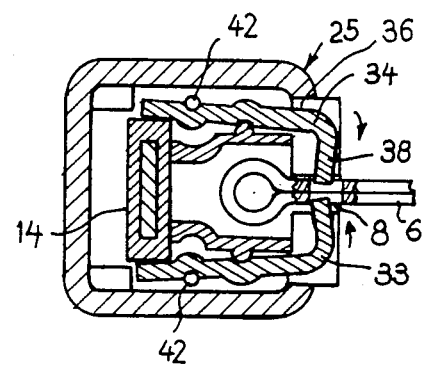
Figure 12:
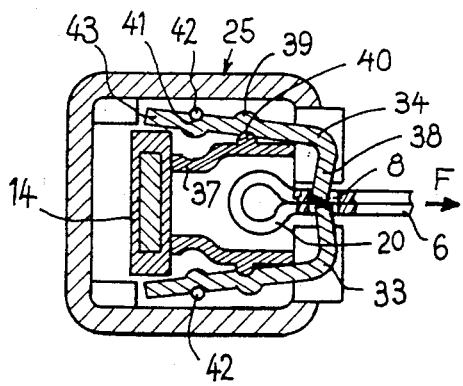
Figure 13:
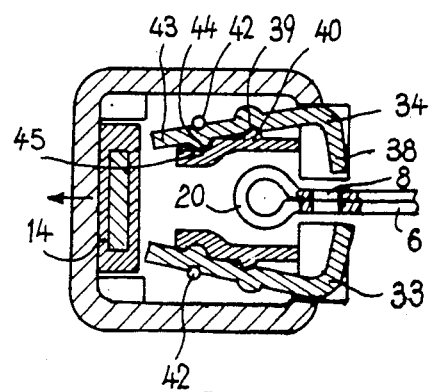

Further, there may also be provided within the case means for detecting the presence of the buckle in the active position. These means, shown in FIGS. 10 and 15, are formed by a switch 52 which is actuated by an actuating arm 53 and a push-member 54 which projects out of the front side of the case in the region of the active position of the tongue, the actuating arm and the push-member being biased by a spring 55. The switch 52 is then actuated when a buckle 56 defining a ramp 57 comes into the active position and depresses the push-member 54 and consequently shifts the arm 53. The information delivered by this switch 52 may be for example used for indicating by any known means the presence or the absence of the buckle in the active position.

What is claimed is:

1. In an anchoring device for a slidable unit comprising a tongue of use in particular in a passive safety belt device for a seat of a motor vehicle having a frame and a body, the device comprising a strap constituting a shoulder strap, a winder connected to an end of the strap for winding the strap, a buckle carried by a free end of the strap and cooperative with the tongue, a guide and retaining rail fixed to the body of the vehicle, the slidable unit being mounted on the rail to be movable between a standby postion, in which a user has access to the seat, and an active position for retaining the user on the seat, actuating means for moving the slidable unit between the standby position and the active postion and comprising driving means and a belt connecting the slidable unit to the driving means, maintaining means for maintaining the tongue firmly fixed relative to the frame of the vehicle and cooperative with the tongue in said active position so as to resist tensile forces exerted on the tongue, said device comprising means for locking the slidable unit in said active position, adapted to prevent the displacement of the unit in a direction parallel to the guide and retaining rail, and the maintaining means being disposed between the guide rail and the means for driving the slidable unit; the improvements wherein the maintaining means comprise a case having a front side, a first lateral side and a second lateral side, the front side defining a slot through which slot the tongue projects, the slot having edges which define two bearing surfaces cooperative with the tongue for withstanding tensile forces exerted on the tongue, a first opening provided in the first lateral side of the case and communicating with the slot and aligned with the guide and retaining rail so as to permit the passage of the slidable unit, a second opening provided in the second lateral side of the case for allowing the passage of a part of the belt, and the locking means comprise at least one cavity provided in the front side of the case, at least one locking element having active portions and disposed in said cavity, the locking element being mounted to be movable between a retracted position, allowing selectively the insertion of the tongue and the withdrawal of the tongue from the active position, and a locking position in which the active portions of the locking element are cooperative with complementary portions of the tongue and with said cavity for retaining the tongue in the active position;

said device further comprising elastically yieldable means combined with the locking element for biasing the locking element to the retracted position thereof; and wherein the locking element comprises a metal strip having adjacent a first end thereof a portion bent at 90° so as to form a hook constituting an active portion of the locking element, the tongue having an opening for receiving the active portion of the locking element in the locking position, the strip having, in a central part thereof, an articulation surface, and, adjacent a second end opposed to said first end, a first bearing surface and a second bearing surface, the device further comprising an inner structure mounted inside the case and having a bearing surface on which the articulation surface of the locking element bears, the first bearing surface being cooperative with said elastically yieldable means, and an actuating element connected to the slidable unit being cooperative with the second bearing surface for selectively displacing and maintaining the locking element in the locking position thereof.

2. An anchoring device according to claim 1, wherein the locking means comprise two of said locking element disposed on each side of the slot in two of said cavity provided in the edges of the slot, the first bearing surface and the second bearing surface are provided on opposite sides of the metal strip, and the elastically yieldable means comprise a U-shaped spring having branches which bear against the first bearing surfaces of the two locking elements.

3. An anchoring device according to claim 2, wherein the inner structure has two bosses respectively cooperative with the two locking elements and the articulation surface and the second bearing surface of each locking element are provided on a side of the respective locking element facing toward the interior of the case, each articulation surface comprises a recess formed in the metal strip and cooperative with a respective one of said bosses on said inner structure, and a planar portion of the metal strip defines said second bearing surface.

4. An anchoring device according to claim 3, wherein the inner structure defines a cavity for each locking element, each locking element comprises, between the articulation surface and the second bearing surface thereof, a second boss adapted to bear inside the respective cavity in the inner structure in the retracted position of each locking element, the second boss being provided in each locking element in alignment with a second recess constituting the first bearing surface of the locking element.

5. An anchoring device according to claim 1, wherein the actuating element comprises an inclined surface cooperative with the second bearing surface of the respective locking element.

6. An anchoring device according to claim 1, wherein the actuating element is moulded onto the belt.

7. An anchoring device according to claim 1, wherein the slot has inclined edges in a region of a junction thereof with the first opening for the purpose of guiding the tongue when it is inserted into the case.

8. An anchoring device according to claim 1, comprising means for detecting the presence of the slidable unit in the active position.

9. An anchoring device according to claim 8, wherein the detecting means comprise a switch disposed in the case and actuatable by the slidable unit.

10. An anchoring device according to claim 1, comprising means for detecting the presence of the buckle in the active position.

11. An anchoring device according to claim 10, wherein said detecting means comprise a switch disposed in the case and including an actuating arm and a push-button projecting out of the case in the region of the active position of the tongue, a ramp on the buckle being cooperative with the push-button and the switch for actuating the switch when the buckle reaches the active position thereof.

12. In an anchoring device for a slidable unit comprising a tongue of use in particular in a passive safety belt device for a seat of a motor vehicle having a frame and a body, the device comprising a strap constituting a shoulder strap, a winder connected to an end of the strap or winding the strap, a buckle carried by a free end of the strap and cooperative with the tongue, a guide and retaining rail fixed to the body of the vehicle, the slidable unit being mounted on the rail to be movable between a standby position, in which a user has access to the seat, and an active position for retaining the user on the seat, actuating means for moving the slidable unit between the standby position and the active position and comprising driving means and a belt connecting the slidable unit to the driving means, maintaining means for maintaining the tongue firmly fixed relative to the frame of the vehicle and cooperative with the tongue in said active position so as to resist tensile forces exerted on the tongue, said device comprising means for locking the slidable unit in said active position, adapted to prevent the displacement of the unit in a direction parallel to the guide and retaining rail, and the maintaining means being disposed between the guide rail and the means for driving the slidable unit; the improvements wherein the maintaining means comprise a case having a front side, a first lateral side and a second lateral side, the front side defining a slot through which slot the tongue projects, the slot having edges which define two bearing surfaces cooperative with the tongue for withstanding tensile forces exerted on the tongue, a first opening provided in the first lateral side of the case and communicating with the slot and aligned with the guide and retaining rail so as to permit the passage of the slidable unit, a second opening provided in the second lateral side of the case for allowing the passage of a part of the belt, and the locking means comprise at least one cavity provided in the front side of the case, at least one locking element having active portions and disposed in said cavity, the locking element being mounted to be movable between a retracted position, allowing selectively the insertion of the tongue and the withdrawal of the tongue from the active position, and a locking position in which the active portions of the locking element are cooperative with complementary portions of the tongue and with said cavity for retaining the tongue in the active position;

wherein the first opening and the second opening are provided at different distances from the front side of the case so that a part of the belt extending between the slidable unit and the second opening is bent and extends in an oblique direction relative to the front side of the case, so that, when a thrust is exerted on the belt for disengaging the slidable unit from the active position thereof, the actuating element of the locking elements is disengaged from the position for maintaining the locking elements in the locking position.

* * * * *